US005695685A

United States Patent [19]

Chau

[11] Patent Number: 5,695,685
[45] Date of Patent: Dec. 9, 1997

[54] PHOSPHOR WITH MODIFIED SURFACE COMPOSITION AND METHOD FOR PREPARATION

[75] Inventor: Chung Nin Chau, Sayre, Pa.

[73] Assignee: Osram Sylvania Inc., Danvers, Mass.

[21] Appl. No.: 775,977

[22] Filed: Jan. 3, 1997

[51] Int. Cl.⁶ .................................................. C09K 11/00
[52] U.S. Cl. ........................... 252/301.4 R; 252/301.65;
 252/301.4 R; 252/301.4 S; 252/301.6 F;
 252/301.4 P; 252/301.4 H
[58] Field of Search .................. 252/301.4 R, 301.6 S,
 252/301.4 S, 301.6 F, 301.4 P, 301.4 H

[56] References Cited

U.S. PATENT DOCUMENTS

| | | | |
|---|---|---|---|
| 4,265,950 | 5/1981 | Graff | 428/35 |
| 4,710,674 | 12/1987 | Sigai | 313/489 |
| 5,196,229 | 3/1993 | Chau | 427/66 |
| 5,433,888 | 7/1995 | Okada et al. | 252/301.4 R |
| 5,624,603 | 4/1997 | Leblans et al. | 252/301.4 R |

FOREIGN PATENT DOCUMENTS

| | | |
|---|---|---|
| 479 298 A1 | 4/1992 | European Pat. Off. . |
| 479 299 A1 | 4/1992 | European Pat. Off. . |
| 479 300 A1 | 4/1992 | European Pat. Off. . |
| 4076450 | 3/1970 | Japan . |
| WO 96/05265 | 2/1996 | WIPO . |

*Primary Examiner*—Melissa Bonner
*Attorney, Agent, or Firm*—Robert F. Clark

[57] ABSTRACT

A surface modified phosphor powder exhibiting increased lumen maintenance. At the outer surface of each phosphor particle, the cations of the phosphor material have been replaced by other cations, e.g., a metal or metalloid cation such as aluminum, barium, calcium, lanthanum, magnesium, strontium, yttrium, zinc, titanium, tantalum, boron, or silicon. The phosphor powder is chemically modified by forming a suspension of phosphor particles in a liquid medium including the metal or metalloid ions in solution. The phosphor suspension is stirred for a time sufficient to permit an ion exchange reaction in which the metal or metalloid ions are substituted for cations of the phosphor to form a layer of the desired metal or metalloid compound at the phosphor outer surface.

21 Claims, No Drawings

PHOSPHOR WITH MODIFIED SURFACE COMPOSITION AND METHOD FOR PREPARATION

CROSS-REFERENCE TO RELATED APPLICATIONS

The present application contains subject matter related to U.S. application Ser. No. [08/775,983], commonly assigned and filed concurrently herewith. Application [08/775,783] is incorporated herein by reference.

BACKGROUND OF THE INVENTION

The present invention relates to lamp phosphors, and particularly to surface-modified phosphor powders exhibiting increased lumen maintenance when used in lamps, as well as methods for modifying the phosphor particle surfaces.

Fluorescent lamps are known to experience a gradual decrease in brightness with extended operation of the lamp. There are several factors contributing to this low lumen maintenance including deposits of impurities from the lamp cathode onto the lamp envelope, changes in the phosphor itself through inter- or intra-atomic reactions, and changes in the glass of the envelope, e.g., due to exposure to ultraviolet radiation. One of the chief causes of low lumen maintenance is the deposition of mercury compounds on the surface of the phosphor coating the interior surface of the lamp envelope. Various mercury compounds are formed as the phosphor is bombarded by atoms and ions of the mercury included in the envelope. Deposition of such mercury compounds is particularly deleterious in low cost, low maintenance phosphors such as zinc orthosilicate (synthetic will-emite) or barium silicate phosphors. A phosphor particle surface less reactive to mercury or having an absorption characteristic that acts as a filter for high energy UV radiation will exhibit improved lumen maintenance in a fluorescent lamp.

Attempts have been made to modify the surfaces of phosphor particles by coating them with, e.g., an inert material such as alumina or other oxide, before their use in the lamp making process, to improve lumen maintenance in the lamp. However, some of these coating attempts have resulted in poor adherence of the coating to the phosphor. Also, solid state diffusion of the oxide components into the bulk phosphor material at high temperatures can generate a new phase boundary between the oxide layer and the phosphor substrate. Undesirable phases can result, e.g., a phase having a high concentration of dislocations or defects in its crystal structure. Such excess dislocations or defects can act as energy traps for the phosphor under certain conditions of solid state diffusion thermodynamics, lowering the lumen output of the phosphor and defeating the purpose of the coating.

Further, many prior art processes for applying the oxide coatings to the phosphor particles involve suspending the phosphor powder in a fluidized bed for MOCVD (metal organic chemical vapor deposition) of the coating. This MOCVD process requires the use of a fluidized bed reactor, elaborate instrumentation, careful air flow and temperature monitoring, and separating out of a very narrow phosphor particle size range for successful suspension of the powder in the fluidized bed. In most of these processes, the oxide coating is deposited on a fully fired phosphor substrate, requiring an extra process step to apply the coating and increasing the cost of the phosphor fabrication process.

Accordingly, it is an object of the present invention to provide a phosphor and a phosphor manufacturing method which overcome the disadvantages of the prior art.

It is yet another object of the invention to provide a phosphor exhibiting modified surface properties.

It is still another object of the invention to provide a phosphor with improved lumen maintenance properties.

It is a further object of the invention to provide a phosphor exhibiting lower affinity for and reactivity with mercury and mercury compounds.

It is another further object of the invention to provide a phosphor exhibiting decreased water affinity and water reactivity.

It is a still further object of the invention to provide a phosphor exhibiting decreased oxygen desorption during lamp operation.

It is a yet further object of the invention to provide a reliable, cost effective chemical reaction process for production of a surface-modified phosphor exhibiting improved maintenance properties.

SUMMARY OF THE INVENTION

In accordance with these objects, in one aspect the invention is a method for chemically modifying the composition of phosphor particle outer surfaces. The method involves substituting selected cations for cations of the phosphor at the particle surfaces by an ion exchange reaction. In a narrower aspect, the reaction takes place in a liquid medium, e.g., an aqueous medium, containing the selected cations in solution. In another narrower aspect, the cations are ions of a metal or metalloid, e.g., aluminum, barium, calcium, lanthanum, magnesium, strontium, yttrium, zinc, titanium, tantalum, boron, or silicon, different from that of which the phosphor is a compound. The metal or metalloid ions typically are provided by a water soluble salt such as an acetate, halide, formate, lactate, or nitrate of the metal or metalloid.

In yet another narrower aspect, the cation substitution involves forming a suspension of the phosphor particles in the liquid medium including the metal or metalloid ions in solution. The phosphor suspension is stirred for a time sufficient to permit the above-described ion exchange reaction to form a layer of a compound of the metal or metalloid at the phosphor particle outer surfaces. The particles may be filtered out of the suspension and dried to produce phosphor particles having a modified surface composition. The amount of the metal or metalloid salt in the liquid medium preferably is about 0.5–1.5 percent by weight, based on the weight of phosphor suspended in the liquid medium.

In another aspect, the invention is a method for improving lumen maintenance of a lamp. The method involves forming a suspension of phosphor particles in a liquid medium including cations of a metal or metalloid to form a first suspension. The metal or metalloid is different from that of which the phosphor is a compound, e.g., those listed above. The first suspension is stirred for a time sufficient to permit an ion exchange reaction in which the metal or metalloid cations are substituted for cations of the phosphor at the phosphor particle outer surfaces to produce phosphor particles having a modified surface composition. A lamp envelope interior surface is coated with a layer of a suspension including the modified particles suspended in a solution of a binder and an aqueous medium. The phosphor layer is dried sufficiently to adhere the phosphor layer to the lamp envelope surface. The lamp envelope is then lehred to burn out the binder and to produce a coating of phosphor particles on the lamp envelope, each particle having a layer including a compound of the metal or metalloid on its outer surface.

In yet another aspect, the invention is a phosphor powder including individual particles of a phosphor material, an outer surface of each particle being a layer in which cations of the phosphor material have been replaced by cations different from the phosphor material cations. In a narrower aspect, the different cations are ions of a metal or metalloid, e.g., aluminum, barium, calcium, lanthanum, magnesium, strontium, yttrium, zinc, titanium, tantalum, boron, or silicon.

In still another aspect, the invention is a phosphor-coating composition for coating an inner surface of a lamp envelope. The composition includes a suspension of a phosphor powder in a solution including a binder and an aqueous medium. The phosphor powder includes individual particles of a phosphor material, the outer surface of each particle being a layer in which cations of the phosphor material have been replaced by cations, e.g., of a metal or metalloid, different from the phosphor material cations. The metal or metalloid may be, e.g., aluminum, barium, calcium, lanthanum, magnesium, strontium, yttrium, zinc, titanium, tantalum, boron, or silicon.

DETAILED DESCRIPTION OF THE PREFERRED EMBODIMENTS

In one exemplary embodiment, a phosphor is surface-modified, or coated, with a layer including a metal compound different from the material of the phosphor by a reaction between a selected cation and the phosphor compound itself. The reaction takes place directly at the surface of each individual phosphor particle. The process involves an ion exchange reaction in which a desired cation, e.g., a metal ion, is substituted for, or replaces, the cation of the phosphor material at the surface of each phosphor particle. The term "metal", as used herein, is intended to mean a metal or a metalloid, for example silicon or boron.

The resulting modified particle surface acts similarly to a coating, but is chemically adhered to the particles of the phosphor powder. Thus, the phosphor exhibits improved adherence and improved lumen maintenance. Additionally, by selection of the phosphor material and the cation the phosphor surfaces can be tailored to exhibit UV filtering properties, decreased water affinity or water reactivity, decreased oxygen desorption, or decreased electrostatic attraction for mercury or mercury compounds.

The ion exchange reaction may be effected by stirring a suspension of the phosphor powder in a liquid, e.g., an aqueous medium, containing the desired cation in solution for a time sufficient to effect the desired degree of reaction. The liquid medium selected is not critical, but may be any liquid which will substantially dissolve the cation-containing component, but in which the phosphor compound is not significantly soluble. Preferably, the amount of cation in solution and the time are sufficient to result in a high concentration of the substituted cations at the surface of each phosphor particle. The amount of cation in solution to effect an optimal extent of ion exchange may be empirically determined without undue experimentation. Alternatively, the amount may be estimated prior to such experimentation by taking into account the phosphor compound material, its surface area, the relative valences of the ions to be exchanged, and the desired surface chemical formulation. Preferably, an excess of the cation component, e.g., a water soluble metal salt, is added to effect maximum surface modification. Typically, about 0.5%–1.5% by weight of a metal salt additive, relative to the weight of the phosphor in suspension, is sufficient to effect the maximum surface modification. The soluble metal salt may be, e.g., an acetate, halide, formate, lactate, or nitrate, or other known metal salt which is soluble in the selected liquid medium. When an excess of the cation is present in solution, the reaction is self-limiting, i.e., given sufficient time, the extent of ion exchange is dependent on such factors as the surface composition and temperature.

Typically, 2–25 hours stirring time is sufficient to effect the ion exchange, with 4–16 hr most typical. The optimum reaction time for a particular cation/phosphor combination is empirically determined. Preferably, the reaction time is sufficient to result in a measurable change in surface properties, e.g., a measurable difference in lumen maintenance in lamps manufactured with the surface-modified phosphor and the unmodified phosphor. Typically, the reaction time is sufficient to maximize the ion exchange, which may be measured, e.g., by the achievement an asymptote in a graphical representation of the measurable change in the desired surface property or by a lack of further change in the desired surface property with further reaction time. The amount of liquid in the suspension should be sufficient to permit the suspension to be stirred readily, for maximum contact of the phosphor particle surfaces by the cations.

To produce a lamp, the surface modified phosphor is suspended in a water-based solution including a binder and, typically, an adherence-enhancing compound, and applied to the lamp envelope interior surface. Alternatively, a water-soluble compound containing the desired cation may be added to a lamp coating slurry with the phosphor and stirred for the required time before application to the lamp envelope. Burn-out of the coated lamp envelope leaves an adhered phosphor coating on the lamp surface. This type of lamp coating process using a phosphor/binder slurry is well known in the art.

The cations chemically bonded to the particle surfaces change the surface characteristics of the phosphor. Thus, the surface properties of the phosphor can be tailored to a particular application, and the lumen maintenance of lamps made with the phosphor can be increased. For example, in the case of a barium silicate phosphor ($BaSi_2O_5$:Pb), the cation may be a lanthanum ion provided by lanthanum chloride ($LaCl_3$) dissolved in an aqueous suspension. The lanthanum ion in the suspension substitutes for the barium ion of the phosphor material in an ion exchange reaction taking place at the surface of each phosphor particle. Similar reaction mechanisms may be used for ion exchange reactions on the surfaces of other phosphors. For example, the phosphor may be a Cool White calcium halophosphate phosphor ($Ca_5(PO_4)_3(F,Cl)$:Sb,Mn), a zinc orthosilicate phosphor ($Zn_2SiO_4$:Mn), calcium apatite phosphor ($Ca_5(PO_4)_3F$:Sb), or yttrium oxide phosphor ($Y_2O_3$:Zn). Also alternatively, the cation may be another metal such as aluminum, barium, calcium, lanthanum, magnesium, strontium, yttrium, zinc, titanium, or tantalum, or a metalloid such as boron or silicon. Typical combinations of these components are given below in Table I.

Especially valuable for substitution are cations providing improved protection for the phosphor from deposited mercury and mercury compounds, resulting in improved lumen maintenance for the lamp. These cation exchanges include lanthanum for calcium or barium, yttrium for calcium or barium, barium for calcium, or aluminum for calcium.

Some examples of effects of the cation exchange described herein are as follows: (1) Calcium halophosphate treated with barium ions exhibits a UV filtering effect. Some of the higher energy UV emitted by mercury, e.g., the 185 nm Hg line in a low pressure mercury vapor lamp, will be filtered out by the barium halophosphate, protecting the calcium halophosphate phosphor from its effects. (2) The

TABLE I

| ION | PHOSPHOR | SURFACE COMPOUND |
|---|---|---|
| lanthanum | barium silicate | lanthanum silicate |
| lanthanum | zinc orthosilicate | lanthanum silicate |
| barium | calcium halophosphate (Cool White) | barium halophosphate |
| lanthanum | calcium halophosphate (Cool White) | lanthanum halophosphate |
| lanthanum | calcium apatite | lanthanum phosphate |
| aluminum | calcium apatite | aluminum phosphate |
| zinc | calcium apatite | zinc phosphate |
| calcium | calcium apatite | calcium phosphate |
| strontium | calcium apatite | strontium phosphate |
| magnesium | calcium apatite | magnesium phosphate |
| yttrium | calcium apatite | yttrium phosphate |
| yttrium | barium silicate | yttrium silicate |
| boron | calcium apatite | boron phosphate | hydrophilic surfaces of calcium apatite phosphor powders maybe made less hydrophilic by treating with lanthanum ions. The water affinity or water reactivity at the phosphor particle surfaces is reduced, which reduces the residual water in the phosphor and prolongs the life and improves the lumen maintenance of a lamp made from the phosphor. (3) Oxygen desorption from a barium disilicate phosphor may be reduced by treatment with lanthanum ions. Reduction of terminal oxygen at the silicate surface by the lanthanum ions reduces defect formation in the phosphor due to oxygen loss during lamp operation. (4) The electrostatic attraction for mercury of barium disilicate or calcium apatite phosphor may be reduced by treatment with lanthanum ions to remove terminal silicate groups and create additional Si—O—Si or Si—O—Ca bridging. The lowered electrostatic potential for mercury at the phosphor particle surfaces improves the lumen maintenance of the phosphor. Typically, the reaction is carried out at ambient temperature. However, a range of 20°–80° C. is suitable for the cation/phosphor combinations listed above. The dry phosphor powder may be suspended in the aqueous cation-containing solution, or the cation-containing compound may be added to the phosphor suspension. In one alternative embodiment, the cation is added to an as-manufactured phosphor slurry taken directly from the washing tank of a phosphor manufacturing facility. In another alternative embodiment, the cation-containing compound is added to a phosphor slurry prepared for coating a lamp envelope. For some cation/phosphor combinations, it may be advantageous to adjust the pH of the solution with, e.g., hydrofluoric (HF), hydrochloric (HCl), or nitric ($HNO_3$) acid. The cation exchange kinetic mechanism is effected by the pH of the solution, e.g., acid catalyzed hydrogenation/dehydrogenation encourages incorporation of the metal ions. Also, the HF strengthens the chemical bonding by substituting higher energy Si—F bonds for some of the Si—O bonds. The optimal pH may be empirically determined.

The following Examples are presented to enable those skilled in the art to more clearly understand and practice the present invention. These Examples should not be considered as a limitation upon the scope of the present invention, but merely as being illustrative and representative thereof.

EXAMPLE 1

Sample 1 was prepared by stirring 100 g of Cool White phosphor ($Ca_5(PO_4)_3(F,Cl):Sb,Mn$) and about 1 g of lanthanum nitrate ($La(NO_3)_3$) additive into about 600 ml of deionized water. This phosphor suspension was stirred for about 4 hours at ambient temperature, then was filtered, dried, and screened (378 mesh).

Sample 2 was prepared in the same manner as Sample 1, except that barium acetate ($Ba(C_2H_3O_2)_3$) was substituted for the lanthanum nitrate.

Sample 3 was prepared in a manner similar to that for Sample 1, by stirring 100 g of Cool White phosphor and about 1 g of lanthanum nitrate into about 600 ml of water. However, after the suspension was stirred for about 5 min, two drops of 28.9N hydrofluoric acid (HF) were added to the suspension to help remove any terminal Si—O bonds at the surface. Stirring then was continued for another 4 hours. The suspension was filtered, dried, and screened as described for Sample 1.

Sample 4 was prepared directly from phosphor slurry from the manufacturing process. About 1 g of lanthanum chloride ($LaCl_3$) was mixed into 1300 ml of Cool White phosphor slurry, specific gravity (SPG)=1.330, taken directly from the washing tank of a phosphor manufacturing facility. The slurry was stirred for about 4 hours, then filtered, dried, and screened as described for Sample 1.

Sample 5 was prepared from a barium silicate phosphor. The barium silicate phosphor, in an amount of 50 g, and about 0.358 g of $LaCl_3 \cdot 7H_2O$ were stirred into 200 ml of water and stirred for 4 hours. The suspension was filtered, dried, and screened as described for Sample 1.

Samples 1–5 and two control samples of virgin Cool White calcium halophosphate phosphor (designated "CW1" and "CW2") and one control sample of virgin barium silicate phosphor (designated "BS") were tested by ESCA (electron spectroscopy for chemical analysis) to determine the atomic composition at the surface of the phosphor particles. The results are shown in Table II.

Samples 1–5 and a sample of each control phosphor were also tested by SNMS (sputtered neutrals mass spectrometry) profiling to determine the composition of the phosphor at various depths from the particle surface. The results are discussed below.

Comparison of the ESCA results for Samples 1–3 and 4 with those for Control Samples CW1 and CW2, respectively, show that a significant number of lanthanum or barium ions have been substituted for calcium ions at the particle surfaces of the Cool White phosphors. Comparison of the ESCA results for Sample 5 with that for Control Sample BS shows that a significant number of lanthanum ions have been substituted for barium ions at the particle surfaces of the barium silicate phosphor. The SNMS studies show that the surfaces of the Cool White phosphor particles are reduced in calcium and enriched in lanthanum or barium (as well as phosphorus) compared to the core of the phosphor particles, while the surfaces of the barium silicate phosphor particles are enriched in lanthanum (as well as silicon and oxygen)

TABLE II

| Sample | O | P | F | Cl | Ca | La | Na | Ba | Pb | Si |
|---|---|---|---|---|---|---|---|---|---|---|
| CW1* | 65 | 12 | 3.8 | ND** | 18 | ND | ND | ND | | |
| 1 | 66 | 12 | 3.6 | ND | 14 | 4.1 | ND | | | |
| 2 | 66 | 12 | 3.5 | 0.1 | 17 | | ND | 1.6 | | |
| 3 | 60 | 12.1 | 7.5 | 0.4 | 14.8 | 5.7 | ND | | | |

TABLE II-continued

| Sample | O | P | F | Cl | Ca | La | Na | Ba | Pb | Si |
|---|---|---|---|---|---|---|---|---|---|---|
| CW2* | 64 | 12.5 | 4.5 | 0.2 | 18.7 | 0 | ND | | | |
| 4 | 60 | 12.6 | 4.7 | 1.2 | 15.1 | 4.7 | 1.3 | | | |
| BS* | 69 | | 0 | ND | | ND | | 8.2 | 0.41 | 23 |
| 5 | 73 | | 0.9 | ND | | 3.4 | | 2.8 | ND | 20 |

*Unmodified phosphor control sample. Samples CW1, 1, 2, and 3 were taken from the same lot of Cool White phosphor, while Samples CW2 and 4 were taken from a second lot of Cool White phosphor. Samples BS and 5 were taken from the same lot of barium silicate phosphor.
**ND = Not detected, or detected in insignificant quantities.

and reduced in barium compared to the particle cores. Thus the ESCA and SNMS results demonstrate the effectiveness of the ion exchange reaction in each of the process variations described.

EXAMPLE 2

Sample 6 was prepared in a manner similar to that described for Sample 4, directly from phosphor slurry from the manufacturing process. About 1 g of lanthanum acetate ($La(C_2H_3O_2)_3$) was mixed into 1300 ml of Cool White phosphor slurry (SPG=1,330) taken directly from the washing tank of a phosphor manufacturing facility. The suspension was stirred for about 4 hours, then filtered but not dried. The wet phosphor cake was broken up by hand before use in lamp processing.

Sample 7 was prepared in the same manner as Sample 6, except that magnesium acetate ($Mg(C_2H_3O_2)_3$) was substituted for the lanthanum acetate.

Sample 8 was prepared in the same manner as Sample 6, except that after stirring the phosphor was dried and screened as described for Sample 1 before use in lamp processing.

Sample 9 was prepared as described for Sample 6, except that magnesium acetate ($Mg(C_2H_3O_2)_3$) was substituted for the lanthanum acetate, and the phosphor was dried and screened as described for Sample 1.

Sample 10 was prepared as described for Sample 6, except that strontium acetate ($Sr(C_2H_3O_2)_3$) was substituted for the lanthanum acetate, and after stirring the phosphor was dried and screened as described for Sample 1.

Samples 6–10 and control Samples CW3 and CW4 were processed into standard F40T12 fluorescent lamps, and the lamp maintenance was determined. The lamp test data are given in Table III, which lists the lumen output at 100 hr of lamp operation and the difference (Δ lumens) between the lumen output of each surface modified phosphor and that of the appropriate control sample.

Sample 11 was prepared by mixing 400 g of Cool White phosphor and about 4 g of calcium acetate ($Ca(C_2H_3O_2)_3$) as dry powders. Sample 11 and control Sample CW5 were processed into standard F40T12 fluorescent lamps, using Polyox organic binder, available from Union Carbide (South Charleston, W. Va.) to prepare the lamp coating slurry and stirring the slurry for 4 hours prior to coating the lamp envelope. The lamp test data are given in Table III.

Sample 12 was prepared in a manner similar to that described for Sample 1. Cool White phosphor, in an amount of 400 g, was suspended in 1200 ml of water. About 1 g of zinc bromide ($ZnBr_2$) was mixed into the suspension, and the suspension was stirred for about 4 hours, then filtered, dried, and screened.

Sample 13 was prepared in the same manner as Sample 12, except that zinc nitrate ($Zn(NO_3)_2$) was substituted for the zinc bromide.

Sample 14 was prepared in the same manner as Sample 12, except that barium chloride ($BaCl_2$) was substituted for the zinc bromide.

Sample 15 was prepared in the same manner as Sample 12, except that lanthanum chloride ($LaCl_2$) was substituted for the zinc bromide.

Samples 11–15 and control Samples CW5, CW6, and CW7 were processed into standard F40T12 fluorescent lamps. The lamp test data are given in Table III.

Sample 16 was prepared directly from a wet phosphor cake taken from the manufacturing process. About 450 g of wet Cool White phosphor cake (containing 12.6% by weight of water) was taken directly from the filter press of a phosphor manufacturing facility and broken up by hand. [OK?] About 4 g of lanthanum acetate ($La(C_2H_3O_2)_3$) was mixed with the wet phosphor into sufficient Polyox binder solution to process the combination into a standard F40T12 fluorescent lamp. The lamp coating slurry was stirred for 4 hours prior to coating the lamp envelope.

Sample 17 was prepared in the same manner as Sample 16, except that magnesium lactate ($Mg(C_3H_5O_3)_2$) was substituted for the lanthanum acetate.

Samples 16–17 and control Sample CW8 were processed into standard F40T12 fluorescent lamps. The lamp test data are given in Table III.

The lamp maintenance data for Samples 6–17 show an increase of 10–62 lumens, or 0.33% –2.08% improvement in the surface-modified phosphor samples over their respective control samples. Thus the results demonstrate the effectiveness of the process in improving lamp maintenance data for the phosphors, even for those phosphors not dried and screened before treatment or before lamp processing.

Although these Examples show the cation-containing compound being added to the liquid medium as a powder, the cation can be added in any form known in the art, e.g., as a pre-dissolved solution or as a gas (e.g., a metal fluoride) bubbled through the liquid medium.

TABLE III

| Sample | Description | 100 hr | Δ Lumens |
|---|---|---|---|
| CW3* | Cool White | 3000 | |
| 6 | Cool White/La acetate | 3012 | 12 |
| 7 | Cool White/Mg acetate | 3020 | 20 |
| CW4* | Cool White | 2984 | |
| 8 | Cool White/La acetate | 3046 | 62 |
| 9 | Cool White/Mg acetate | 3002 | 18 |
| 10 | Cool White/Sr acetate | 3025 | 41 |
| CW5* | Cool White | 2992 | |
| 11 | Cool White/Ca acetate | 3028 | 36 |
| CW6* | Cool White | 2953 | |
| 12 | Cool White/Zn bromide | 2983 | 30 |
| 13 | Cool White/Zn nitrate | 2973 | 20 |

TABLE III-continued

| Sample | Description | 100 hr | Δ Lumens |
|---|---|---|---|
| CW7* | Cool White | 3012 | |
| 14 | Cool White/Ba chloride | 3056 | 44 |
| 15 | Cool White/La chloride | 3054 | 42 |
| CW8* | Cool White | 2989 | |
| 16 | Cool White/La acetate | 3005 | 16 |
| 17 | Cool White/Mg acetate | 2998 | 10 |

*Unmodified phosphor control sample.
Samples CW3 and 6–7 were taken from the same lot of Cool White phosphor, while Samples CW4 and 8–10 were taken from a second lot, Samples CW5 and 11 were taken from a third lot, Samples CW6 and 12–13 were taken from a fourth lot, Samples CW7 and 14–15 were taken from a fifth lot, and Samples CW8 and 16–17 were taken from a sixth lot.

The invention described herein presents to the art a novel, improved phosphor and a method for modifying the surfaces of phosphor particles which are particularly useful for manufacturing fluorescent lamp phosphors. The chemically surface-modified phosphor exhibits improved lumen maintenance. Additionally, depending on the phosphor material and the selected cation used for the modification, the phosphor can exhibit UV filtering properties, decreased water affinity or water reactivity, decreased oxygen desorption, or decreased electrostatic attraction for mercury or mercury compounds. The surface modification method is a reliable, cost effective chemical adsorption process for production of a surface-modified phosphor exhibiting improved maintenance properties.

While there has been shown and described what are at present considered the preferred embodiments of the invention, it will be apparent to those skilled in the art that modifications and changes can be made therein without departing from the scope of the present invention as defined by the appended claims.

We claim:

1. A method for chemically modifying the composition of outer surfaces of particles of a phosphor, said method comprising substituting selected cations for cations of said phosphor at said surfaces by an ion exchange reaction.

2. A method in accordance with claim 1 wherein said reaction takes place in a liquid medium containing said selected cations in solution.

3. A method in accordance with claim 2 wherein said liquid medium is an aqueous medium.

4. A method in accordance with claim 2 wherein said selected cations are ions of a metal or metalloid different from said phosphor cations.

5. A method in accordance with claim 4 wherein said metal or metalloid is selected from the group consisting of aluminum, barium, calcium, lanthanum, magnesium, strontium, yttrium, zinc, titanium, tantalum, boron, and silicon.

6. A method in accordance with claim 5 wherein said metal or metalloid ions are provided by a water soluble salt selected from the group consisting of acetates, halides, formates, lactates, and nitrates of said metal or metalloid.

7. A method in accordance with claim 4 wherein said cation substitution comprises:
   forming a suspension of said phosphor particles in said liquid medium, said liquid medium including said metal or metalloid ions in solution;
   stirring said phosphor suspension for a time sufficient to permit an ion exchange reaction in which said metal or metalloid ions are substituted for cations of said phosphor to form a layer comprising a compound of said metal or metalloid at an outer surface of said phosphor particles.

8. A method in accordance with claim 7 further comprising:
   filtering said particles out of said suspension; and
   drying said particles to produce phosphor particles having a modified surface composition.

9. A method in accordance with claim 7 wherein said metal or metalloid ions are provided by a water soluble salt selected from the group consisting of acetates, halides, formates, lactates, and nitrates of said metal or metalloid, and the amount of said metal or metalloid salt in said liquid medium is about 0.5–1.5 percent by weight, based on the weight of phosphor suspended in said liquid medium.

10. A method for improving lumen maintenance of a lamp comprising:
   forming a first suspension of particles of a phosphor in a liquid medium including cations of a metal or metalloid, said metal or metalloid being different from that of which said phosphor is a compound;
   stirring said first suspension for a time sufficient to permit an ion exchange reaction in which said metal or metalloid cations are substituted for cations of said phosphor at the phosphor particle outer surfaces to produce phosphor particles having a modified surface composition;
   coating an interior surface of a lamp envelope with a layer of a second suspension comprising said modified particles suspended in a solution comprising a binder and an aqueous medium;
   drying said phosphor layer sufficiently to adhere said phosphor layer to said lamp envelope surface; and
   lehring said lamp envelope to burn out said binder and to produce a coating of phosphor particles on said lamp envelope, each particle having a layer comprising a compound of said metal or metalloid on its surface.

11. A method in accordance with claim 10 further comprising:
   filtering said phosphor particles out of said first suspension;
   drying said particles to produce said modified phosphor particles; and
   forming said second suspension by suspending said modified particles in said binder/aqueous medium solution.

12. A method in accordance with claim 10 wherein said liquid medium is an aqueous medium.

13. A method in accordance with claim 10 wherein said metal or metalloid is selected from the group including aluminum, barium, calcium, lanthanum, magnesium, strontium, yttrium, zinc, titanium, tantalum, boron, and silicon.

14. A method in accordance with claim 13 wherein said metal or metalloid ions are provided by a water soluble salt selected from the group consisting of acetates, bromides, formates, halides, lactates, and nitrates of said metal or metalloid.

15. A method in accordance with claim 14 wherein the amount of said metal or metalloid salt in said liquid medium is about 0.5–1.5 percent by weight, based on the weight of phosphor suspended in said liquid medium.

16. A phosphor powder comprising individual particles of a phosphor material, an outer surface of each of said particles being a layer in which cations of said phosphor material have been replaced by cations different from said phosphor material cations.

17. A phosphor powder in accordance with claim 16 wherein said different cations are ions of a metal or metalloid.

18. A phosphor powder in accordance with claim 17 wherein said metal or metalloid is selected from the group including aluminum, barium, calcium, lanthanum, magnesium, strontium, yttrium, zinc, titanium, tantalum, boron, and silicon.

19. A phosphor-coating composition for coating an inner surface of a lamp envelope, said composition comprising a suspension of a phosphor powder in a solution comprising a binder and an aqueous medium, said phosphor powder comprising individual particles of a phosphor material, an outer surface of each of said particles being a layer in which cations of said phosphor material have been replaced by cations different from said phosphor material cations.

20. A phosphor-coating composition in accordance with claim 19 wherein said different cations are ions of a metal or metalloid.

21. A phosphor-coating composition in accordance with claim 20 wherein said metal or metalloid is selected from the group including aluminum, barium, calcium, lanthanum, magnesium, strontium, yttrium, zinc, titanium, tantalum, boron, and silicon.

* * * * *